May 8, 1951      L. J. ROTH ET AL      2,551,706
EXPANSION THERMOMETER AND METHOD OF MAKING THE SAME
Filed July 23, 1946
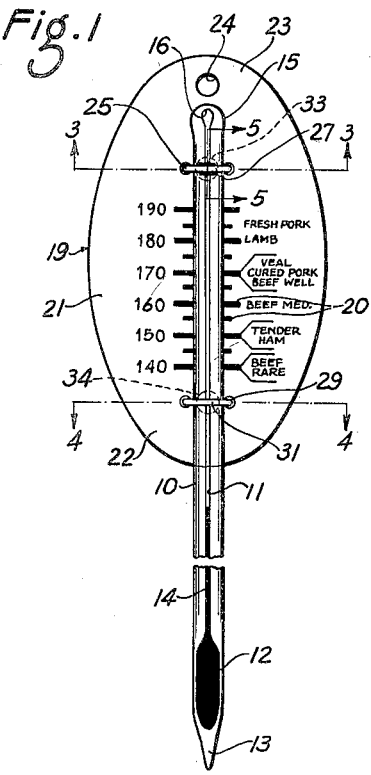
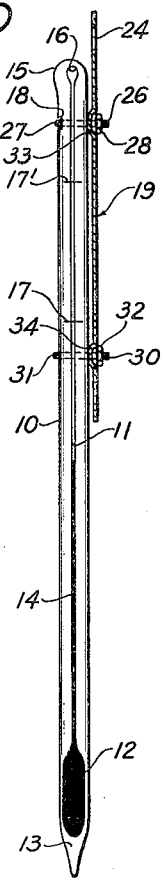
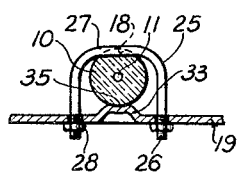
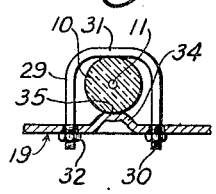
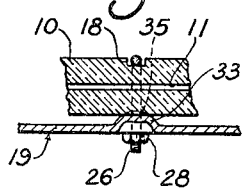
Lawrence J. Roth
Anthony J. Miller
INVENTORS
BY George A. Gillette, Jr.
ATTORNEY Patented May 8, 1951

2,551,706

UNITED STATES PATENT OFFICE 2,551,706

EXPANSION THERMOMETER AND METHOD OF MAKING THE SAME

Lawrence J. Roth and Anthony J. Miller, Rochester, N. Y.

Application July 23, 1946, Serial No. 685,604

9 Claims. (Cl. 73—376)

The present invention relates to an expansion thermometer and method of making the same and more particularly to a meat roast thermometer and to methods of mounting the same upon a scale member.

Heretofore thermometers for determining the internal temperature of meat being cooked or roasted have not been made of low coefficient of expansion glass and are easily broken by abrupt temperature changes, have had the temperature graduations provided directly upon the glass tube and are difficult to read, or are mounted closely adjacent to the scale number so that it is difficult to keep the thermometer and scale clean, sanitary and readable. Although the thermometer assembly shown is specially suitable as a meat roast thermometer it is to be understood that the features of the invention are equally applicable to thermometers for general use.

The primary object of the present invention is the provision of a thermometer which has a tube of low coefficient of expansion glass which is easy to read and keep clean, and which is accurately mounted upon a scale member.

Another object of the invention is the provision of a thermometer mounted in spaced relation to a scale member having graduations and accurately positioned upon said scale member.

A further object is the provision of a thermometer tube provided with a notch in predetermined relation to the temperature response of said thermometer and a scale member having a locating or mounting means engaging said notch for accurately relative positioning of said thermometer and scale member.

Still another object of the invention is the provision of a scale member having integral spacing embossings and carrying a fastening member for engaging a notch in a thermometer tube for accurate location of said tube in spaced relation to said scale member.

A still further object of the invention is the provision of a method of notching said thermometer tube of negligible expansion glass and mounting or locating said tube with respect to a scale member.

Other and further objects of the invention will be suggested to those skilled in the art by the disclosure which follows.

The aforementioned and other objects of the invention are embodied in a fluid expansion thermometer comprising a scale member, a thermometer tube provided with a notch in predetermined relation to the temperature response of the thermometer, and a locating and/or mounting means connected to the scale member and engaging said notch for accurate relative positioning of said tube and scale member. Preferably spacing means or spacing embossings on the scale member maintain the thermometer tube and scale member in spaced relation for ease of cleaning said tube and scale member, for better reading of the scale member, and to reduce the temperature effect of the scale member upon the thermometer. The method of the invention makes possible the preparation of the thermometer tube for such accurate and spaced positioning with respect to said scale member.

Reference is hereby made to the accompanying drawings wherein like reference numerals designate similar elements and wherein:

Fig. 1 is a front elevation of a fluid expansion thermometer mounted on a scale member according to the invention.

Fig. 2 is a side elevation of the thermometer tube and scale member of the invention.

Fig. 3 is a horizontal section on the line 3—3 of Fig. 1.

Fig. 4 is a horizontal section on the line 4—4 of Fig. 1.

Fig. 5 is a fragmentary vertical section on the line 5—5 of Fig. 1.

In the illustrated embodiment, the fluid expansion thermometer comprises a glass tube 10 preferably made of low or negligible coefficient of expansion glass, such as Pyrex glass which is made by the Corning Glass Company of Corning, New York. Preferably the thermometer tube 10 is made from straight hollow tubing of Pyrex glass, having a fine bore 11 therethrough and cut to suitable lengths. One end of tube 10 is heated in a flame of illuminating gas and oxygen so that said end of tube 10 is closed and a ball of molten glass is formed. Air under pressure is then forced from the other end of the tube through the bore 11 and the ball of molten glass is blown into a round bulb. Such bulb is then drawn into a cylindrical tube provided with a fluid reservoir 12 and having a pointed end 13 by attaching another tube to the bottom of the blown bulb and stretching or drawing the latter.

The bore 11 and reservoir 12 are filled preferably with a high temperature range fluid 14, the excess of fluid 14 is removed from the bore 11, and the top of tube 10 is sealed, all by well known methods and techinques. Such sealing or enclosing of the top or other end of tube 10 is accomplished by heating and manipulation so that a slightly enlarged end 15 provided with an expansion chamber 16 is formed. For purposes of the invention and for reasons to be explained later said end 15 is slightly displaced eccentrically as illustrated at the top of tube 10 in Fig. 2. In other words one side of enlarged end 15 is in alignment with the outer surface of cylindrical tube 10 and this straight side of tube 10 ultimately becomes the rear side thereof.

The first step of the method of the invention comprises the provision of a recess or notch in the tube 10 and in predetermined relation to the temperature response thereof. Such notch or recess in the tube 10 is engaged by a locating and/or fastening part on the scale member and the location of the notch or recess is determined by the spacing of the locating and/or fastening part with respect to the graduations on the scale member and so that the tube 10 will be located or mounted upon the scale member to make one or more points of known temperature response correspond to the graduations of the scale member.

For example, the therometer tube 10 is placed in a bath of known temperature, such as 144.5° F., and the fluid 14 expands to a point corresponding to that temperature. One side of tube 10 is then pointed or marked, as by a scratch 17 see Fig. 2, opposite the top of the thermometer fluid 14 at said known temperature. The recess or notch in tube 10 is then provided so that the mark or scratch 17 will register with a corresponding or corrected reading on the scale member. For some purposes the tube 10 will be provided with a transverse notch 18 so that the mark 17 is opposite the point or graduation on the scale member corresponding to the temperature at which the mark 17 was made. However, in a meat roast thermometer a certain length of the fluid 14 is subjected directly to the oven temperature and the fluid 14 itself expands according to the character of the fluid and a correction should be introduced. Thus, if the recess or notch 18 is located so that the positioning and/or fastening member engages said recess or notch 18 to bring the mark 17 opposite the 140° graduation on the scale member a proper correction for such abnormal expansion of the thermometer fluid is introduced.

The scratching or pointing of the tube 10 may also be done at another temperature, such as 188.5° F., and a second mark 17' is placed upon the tube 10 opposite the top of the fluid when the thermometer is placed in a bath at such second known temperature. The distance between marks 17 and 17' indicates the response range of the thermometer tube 10 and is used to match the particular tube 10 to one of a series of scale members having a corresponding range of temperature graduations. Hence a scale member is selected which has its 140° and 185° graduations spaced at a distance equal or substantially equal to the distance between marks 17 and 17'. The differences between an actual response of 144.5° and an indicated 140° F. and between an actual 188.5° and an indicated 185° F. having been determined to be the proper correction for abnormal heating of the fluid 14 and expansion within itself. Said marks 17 and 17' are preferably placed on the side of tube 10 so as not to interfere after mounting with observing the fluid position within the tube 10.

The recess or transverse notch 18 is thus provided in the tube 10 at a point spaced a fixed distance from the mark 17 or from the midpoint between marks 17 and 17'. Said recess or notch 18 may be at any place along that portion of tube 10 which is co-extensive to the scale member but is preferably provided in the front side of tube 10 and beyond the normal range of the thermometer or beyond the range of graduations on the scale member later to be described.

Such recess or transverse notch 18 may be formed in tube 10 by any known manner but we have found that transverse notching in the Pyrex or low expansion glass tube 10 can be accurately and readily provided by relatively moving the tube 10 transversely of a glass saw which is a water-cooled abrasive wheel. The use of the glass saw to provide the notch 18 is particularly advantageous because the glass of tube 10 is worked or cut while the glass is below the annealing temperature of the glass. The glass saw may merely be moved transversely of a fixture for holding marks 17, or 17 and 17', on the tube 10 in registry with an index or indices on the fixture. By virtue of such use of said glass saw or water-cooled abrasive wheel and working or notching the glass below its annealing temperature, the walls of the notch are more accurately and uniformly located and spaced, and there is little or no danger of deforming or stressing the glass of the thermometer tube 10 or changing the temperature response of the thermometer.

Although the notching of the thermometer tube 10 has been described as following the pointing or marking of the lateral side of tube 10, it is to be understood that such pointing or marking of the tube 10 may be accomplished in other ways or may be combined with the notching step as by placing the tubes 10, when heated to a predetermined temperature, in the fixture for holding the tubes 10 while being cut or impressed with the transverse notch 18.

The notched thermometer tubes 10 are now accurately and securely mounted upon a scale number 19 which carries a range of graduations 20 corresponding to temperatures, types of meat to be roasted, or both. The scale member 19 may have any convenient form but preferably is of sheet metal, has a central portion 21 which carries the graduations 20, and has end portions 22 and 23. End portion 23 may be provided with a hole 24 for hanging up the thermometer assembly.

A locating means or member is connected to said scale member 19 and has a portion engaging the recess or transverse notch 18 in thermometer tube 10 for accurate relative positioning of said scale member 19 and thermometer tube 10. While such locating means or member may be separately provided it is preferable to combine the same with the mounting or fastening means for attaching the tube 10 to scale member 19. Specifically the locating and/or fastening means may comprise a U-shaped member 25 having threaded ends 26 and having a flat central portion 27. Said U-shaped member 25 straddles the tube 10 with the central portion 27 within and engaging the side walls of notch 18 in tube 10 and with the threaded ends 26 extending through scale member 19 for engagement by nuts 28.

A second mounting or fastening means comprises a U-shaped member 29 having threaded ends 30 and a central portion 31. Such U-shaped member 29 also straddles the tube 10 and has its threaded ends 30 extending through scale member 19 for engagement by nuts 32. As shown the second mounting or fastening means merely engages the outside of the tube 10 but it is clear that, if desirable or necessary, as for longer or wider range scale members, the second fastening or mounting means could also engage a second notch provided in the thermometer tube 10 in predetermined relation to the temperature response thereof, as already described. Spacing of the two mounting means on opposite sides of the range of graduations 20 or so that U-shaped members 25 and 29 respectively are operatively connected to end portion 23 and 22 of the scale member 19 insures an obstructed view of the thermometer reading. It shall also be understood that the locating means and/or fastening means may be provided in different forms and at different points within the scope of the invention as long as they locate and support the thermometer tube 10 accurately and securely upon the scale member 19.

In as much as the thermometer tube 10 and scale member 19 may have undesirable effects upon each other, an important feature of the invention is mounting of the thermometer tube 10 in parallel spaced relation to the scale member 19. Such spacing can be accomplished by providing spacing means, preferably as two spacing members in spaced relation to each other, between said tube 10 and the scale member 19. While such spacing means or members can be separately provided, it is more convenient to deform or emboss them from the sheet material of the scale member 19. In the illustrated embodiment of the invention circular embossings 33 and 34 are deformed from scale member 19 and are preferably in juxtaposition respectively to the U-shaped members 25 and 29. Each of said embossings 33 and 34 have a cylindrically concave portion 35 in the tops thereof and of a curvature which fits the periphery of the thermometer tube 10. As a result the U-shaped members 25 and 29 hold the tube 10 cradled in the concave portions 35 of the embossings 33 and 34 and the tube 10 is securely and accurately mounted in parallel spaced relation to the scale member 19 and the graduations 20 thereon.

Among the advantages of providing a space between the tube 10 and scale member 19 are ease of reading the graduations 20, reducing transmission of heat from the scale member 19 to the thermometer tube 10, and greater ease of cleaning therebetween. The graduations 20 on the scale member 19 can be more easily read because there is better illumination of those portions of the graduations 20 which are directly behind the tube 10 and bore distortion from the tube 10 is eliminated, such bore distortion makes it difficult to read graduations directly on a thermometer tube. On account of its greater specific heat the scale member 19 will transmit heat by conduction and/or convection to the thermometer tube 10 and thus render the thermometer reading inaccurate, however, the two point spacing means reduces considerably the heat by conduction from scale member 19 to tube 10 and the spacing itself reduces the heat transmitted by convection. Also the space between the tube 10 and scale member 19 allows thorough cleaning of the tube and scale member, which is an important sanitary consideration in a meat roast thermometer, and which also improves ease of reading because of the greater transparency of a clean tube 10 and greater visibility of the clean graduations 20. It will now be understood that the eccentric displacement of enlarged end 15 of the tube 10 serves to maintain the same spacing between the scale member 19 and enlarged end 15 as is provided between said scale member 19 and the rest of thermometer tube 10 so as to gain the full and complete advantages of such spacing.

Although the thermometer tube 10 has been illustrated and described as being cylindrical it is to be understood that other shapes of tubes such as lens shaped tubes having only one side cylindrical, may be used equally as well even to fitting into the concave tops 35 of the embossings 33 and 34. Also the locating and/or fastening means has been disclosed as a U-shaped member but may well be any shape so as to engage a recess or notch in the tube 10. Since variations of the fastening means and calibrating methods other than those described herein may be undertaken without departing from the spirit of our invention, the present disclosure is to be understood as being merely illustrative and the scope of the invention is defined in the claims which follow.

Having now particularly described our invention, what we desire to secure by Letters Patent of the United States and what we claim is:

1. A meat roast fluid expansion thermometer comprising a flat scale member bearing spaced graduations, a thermometer tube provided with a recess located in accurate predetermined relation to the temperature response of said thermometer tube, fastening means connected to said scale member and engaging said recess accurately to position and hold said thermometer tube perpendicularly across said graduations, and a pair of rigid spacing members each completely between said scale member and said tube, each abutting the side of said tube facing said scale member, and maintaining said tube in parallel spaced relation to said scale member without obstructing observation of said tube.

2. A fluid expansion thermometer comprising a scale member bearing spaced graduations and having a pair of integral embossings, a thermometer tube provided with a transverse recess located in predetermined relation to the temperature response of said thermometer tube and fastening means attached to said scale member, holding said tube against said embossings and in spaced relation to said scale member over said graduations, and including a portion within said recess in the tube accurately to locate said tube in operative and calibrated relation to said graduations.

3. A fluid expansion thermometer comprising a flat scale member bearing on a plane surface thereof longitudinally spaced, transverse and continuous graduations and having a pair of integral embossings each longitudinally beyond each extreme graduation and having faces above the plane surface of said scale member and graduations, a thermometer tube provided with a transverse recess located in accurate predetermined relation to the temperature response of said thermometer tube, and a fastening member attached to said scale member and having a portion within said recess in the tube to hold said tube against the faces of said embossing in spaced relation to said scale member and accurately to locate said tube in operative, spaced and calibrated relation over said graduations.

4. A fluid expansion thermometer comprising a backing member of sheet material, a cylindrical thermometer tube having an enlarged end forming an expansion chamber and displaced to align said tube and end at one side thereof, said thermometer tube being provided with a transverse recess in the side opposite said one side of said tube and below said expansion chamber, a pair of spacing members between said backing member and said tube, and mounting means connected to said backing member, engaging said recess and holding said thermometer tube against said spacing members with said enlarged end outwardly away from said backing member; and with the aligned side of said tube in parallel spaced relation to said backing member.

5. A fluid expansion thermometer comprising a backing member of sheet material, a cylindrical thermometer tube having an end enlarged eccentrically to form an expansion chamber and to align said tube and end at one side thereof, said thermometer tube being provided with a transverse recess in the side opposite said one side of said tube and below said expansion chamber, and located in predetermined relation to the temperature response of said thermometer tube, a pair of spacing members between said backing member and said tube, and mounting means connected to said backing member, engaging said recess and holding said thermometer tube against said spacing members with said enlarged end outwardly away from said backing member; and with the aligned side of said tube in parallel spaced relation to said backing member.

6. A meat roast thermometer comprising a hollow glass tube provided with a reservoir, having a pointed end, and having the other end sealed to provide an expansion chamber, said sealed end having one side aligned with the outer wall of said tube and being enlarged toward the other side of said tube, an expansible fluid in said tube and reservoir, said other side of the tube being provided with a transverse notch located in accurate predetermined relation to the temperature response of said thermometer tube, a scale member bearing graduations, said scale member having a pair of embossings spaced along said graduations, each embossing having circular side walls and concave faces above the graduated surface of said scale member, and a pair of U-shaped fastening members straddling said tube and each of said embossings and fastened to said scale member, one of said fastening members having a straight central portion within the notch cut in said tube accurately to position and hold said tube in spaced relation to said scale member.

7. In a method of assembling a fluid expansion thermometer tube and scale member having graduations for a range of temperatures, the steps of heating the thermometer tube to a known temperature, marking said thermometer tube opposite the top of the fluid therein and while subject to said known temperature, and providing a locating notch in said tube at a fixed distance from the marking and while the entire tube is below the annealing temperature of the glass thereof.

8. In a method of mounting a fluid expansion thermometer tube adapted to be inserted into a substance being heated, upon a scale member having a range of temperature graduations, the steps of heating the thermometer tube to a known temperature, marking the tube opposite the top of the fluid therein at said known temperature, and providing a locating recess in said tube at a distance from said marking, which distance is determined by said known temperature and the temperature expansion within the fluid itself in the exposed portion of said thermometer tube.

9. In a method of mounting a fluid expansion thermometer tube, adapted to be inserted into a substance being heated, upon a scale member having a range of temperature graduations, the steps of heating the thermometer tube to a known temperature at the lower end of the temperature range, marking the tube opposite the top of the fluid therein of said known temperature, and providing a locating notch in said tube at a position spaced from said marking and beyond the range of temperature graduations, the space between said marking and notch being determined by said known temperature plus the temperature range plus the temperature expansion within the fluid itself in the exposed portion of said thermometer tube.

LAWRENCE J. ROTH.
ANTHONY J. MILLER.

REFERENCES CITED

The following references are of record in the file of this patent:

UNITED STATES PATENTS

| Number | Name | Date |
| --- | --- | --- |
| 530,928 | Craw | Dec. 18, 1894 |
| 1,593,159 | Brush | July 20, 1926 |
| 1,995,250 | Hiergesell | Mar. 19, 1935 |
| 2,119,126 | Bising | May 31, 1938 |
| 2,119,344 | Nurnberg | May 31, 1938 |